(12) United States Patent
Kolor et al.

(10) Patent No.: US 7,733,821 B2
(45) Date of Patent: Jun. 8, 2010

(54) CORE NETWORK INTEROPERABILITY IN A PICO CELL SYSTEM

(75) Inventors: Sergio Kolor, Haifa (IL); Andrew Hunter, San Diego, CA (US); Michael Green, Zichron Yaakov (IL); Nikhil Jain, San Diego, CA (US); Qiuzhen Zou, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 1239 days.

(21) Appl. No.: 10/641,454

(22) Filed: Aug. 14, 2003

(65) Prior Publication Data
US 2007/0177577 A1    Aug. 2, 2007

Related U.S. Application Data

(60) Provisional application No. 60/403,807, filed on Aug. 14, 2002.

(51) Int. Cl.
*H04L 12/28* (2006.01)
*H04L 12/66* (2006.01)

(52) U.S. Cl. ............... 370/328; 370/401; 370/352; 370/235

(58) Field of Classification Search ........... 370/349, 370/410, 351, 261, 401, 352, 465, 252, 353, 370/328, 235
See application file for complete search history.

(56) References Cited

U.S. PATENT DOCUMENTS

| | | | | |
|---|---|---|---|---|
| 6,125,117 | A | 9/2000 | Martin et al. | 370/397 |
| 6,466,550 | B1 * | 10/2002 | Foster et al. | 370/261 |
| 6,574,213 | B1 | 6/2003 | Anandakumar et al. | 370/349 |
| 7,047,013 | B1 * | 5/2006 | Muysewinkel et al. | 455/445 |
| 7,058,042 | B2 * | 6/2006 | Bontempi et al. | 370/338 |
| 7,120,133 | B1 * | 10/2006 | Joo et al. | 370/328 |
| 7,164,665 | B2 * | 1/2007 | Tourunen | 370/329 |
| 7,170,879 | B2 * | 1/2007 | Kim | 370/338 |
| 7,283,533 | B1 * | 10/2007 | Kumar et al. | 370/395.52 |
| 7,283,541 | B2 * | 10/2007 | Michelson et al. | 370/401 |
| 7,302,497 | B2 * | 11/2007 | Vilander et al. | 709/249 |
| 2003/0007496 | A1 * | 1/2003 | Brown et al. | 370/401 |

(Continued)

FOREIGN PATENT DOCUMENTS

CN            1282182            1/2001

OTHER PUBLICATIONS

International Search Report, PCT/US03/25569, International Searching Authority, European Patent Office, Jan. 27, 2004.

(Continued)

*Primary Examiner*—George Eng
*Assistant Examiner*—Brandon J Miller
(74) *Attorney, Agent, or Firm*—Sandip (Micky) S. Minhas; Florin Corie (57) ABSTRACT

In a wireless communication system, a method and apparatus of communicating between at least one base station and a core network is claimed. Signaling messages and voice streams are transported using packet-switched protocols (IP). A CIC field (Circuit Identity Code) is used to identify at least one VoIP streams. The CIC field may be interpreted as a UDP port number for the voice over IP stream. Also, a synchronization source or contributing source filed of a RTP header may be used as the CIC field.

24 Claims, 7 Drawing Sheets

U.S. PATENT DOCUMENTS

2003/0145108 A1* 7/2003 Joseph et al. ............... 709/239
2003/0235184 A1* 12/2003 Dorenbosch et al. ........ 370/352
2004/0076277 A1* 4/2004 Kuusinen et al. ....... 379/202.01
2004/0172265 A1* 9/2004 Spragle et al. ................. 705/1

OTHER PUBLICATIONS

International Preliminary Examination Report, PCT/US03/25569, International Preliminary Examining Authority, United States, Apr. 29, 2005.

* cited by examiner

CORE NETWORK INTEROPERABILITY IN A PICO CELL SYSTEM

CROSS-REFERENCE TO RELATED APPLICATIONS

This application claims the benefit of priority of U.S. Provisional Patent Application entitled "Core Network Interoperability In A Pico Cell System" Ser. No. 60/403,807, filed on Aug. 14, 2002, which application is incorporated herein by reference.

BACKGROUND OF THE INVENTION

I. Field of the Invention

The invention generally relates to an apparatus and method for providing infrastructure in a wireless communication system. More particularly, the invention relates to an IP-based (Internet Protocol-based) cdma2000 base station.

II. Background

Wireless communications systems are widely deployed to provide various types of communication such as voice, data, packet data, and so on. These systems may be multiple access systems capable of supporting communication with multiple users sequentially or simultaneously by sharing the available system resources. Examples of such multiple access systems include code division multiple access (CDMA), time division multiple access (TDMA), orthogonal frequency division multiplexing (OFDM), and orthogonal frequency division multiple access systems (OFDMA).

The hardware used for infrastructure support for wireless systems are typically dedicated for the given system. For example, a CDMA2000-1x based infrastructure comprises CDMA 2000 1x Base Station Transceiver Subsystems (BTSs) and Base Station Controlloers (BSCs), a CDMA2000-1xEVDO (also known as High Data Rate, or HDR) based infrastructure comprises CDMA-1xEVDO BTSs and BSCs, and a Global System for Mobile Communications (GSM) based infrastructure comprises GSM BTSs and BSCs.

For wireless providers, having to provide dedicated hardware for each different multiple access system is an expensive and somewhat hardware-redundant proposition. For example, traditional infrastructure design in k sectors over m types of air interfaces and n bands requires the use of k×m×n RF modules. This is especially true in so called "hot-spots", or areas having a high concentration of users. Also, coverage in buildings is traditionally somewhat spotty, as the building itself leads to interference with infrastructure equipment. Further, there are frequently space limitations in hot spots or in buildings.

Synchronous wireless access systems, such as CDMA (IS-95 and IS-2000) require accurate time and frequency references at each BTS. In traditional infrastructure systems, each BTS has a dedicated global positioning system (GPS) time/frequency server to provide such time and frequency information to the BTS. Providing a dedicated GPS server contributes to significant cost infrastructure costs and potentially redundant resources, particularly within confined areas, buildings or other hotspots.

Traditional cdma2000(base stations are connected to the core network via standard circuit switched protocols (defined in the IOS specifications—TIA/EIA-2001), which are transported over framed-T1 lines.

SUMMARY

In general, existing VoIP systems use the SIP protocol to control the VoIP streams.

A novel concept of a so-called "picoCell" system is the combination between IOS call control protocols, which were originally designed for circuit-switched connections, and packet-switched VoIP streams protocols.

Thus, a novel solution is presented herein by solving the combination of IOS A1 signaling protocols and the VoIP protocols. Therefore, no SIP servers are required, and traditional IS-41 call model is still supported. The IOS SS is responsible for all the call control algorithms at the core network. The picoCell base station uses packet-switched protocols (IP) to transport the signaling messages and the voice streams instead of traditional circuit-switched protocols.

A significant issue solved is the use of the CIC field (Circuit Identity Code) to identify VoIP streams, instead of the traditional use the CIC field, which represent a circuit in a T1 trunk.

Several alternative solutions are presented. In summary, the solutions are:

to interpret the CIC field as the UDP port number for the VoIP stream, use the SSRC field of the RTP header as the CIC within the VoIP stream, use the CSRC field of the RTP header as the CIC within the VoIP stream, and define a new RTP header extension including the CIC within the VoIP stream.

Accordingly, in a wireless communication system, a method and apparatus of communicating between at least one base station and a core network is claimed. Signaling messages and voice streams are transported using packet-switched protocols (IP). A CIC field (Circuit Identity Code) is used to identify at least one VoIP streams. The CIC field may be interpreted as a UDP port number for the voice over IP stream. Also, a synchronization source or contributing source filed of a RTP header may be used as the CIC field.

The network architecture of the picoCell system relies on the transport of signaling messages and traffic frames over IP protocols. A Soft-Switch (SS) and a Media-Gateway (MG), together acting as an MSC, provide the core network switching capabilities. The Soft-Switch performs as an inter-working function between the picoCell the traditional IS-41 network of the mobile operator. Unlike traditional CDMA base stations, the picoBSC does not perform the transcoding of voice packets (vocoding). Instead, the voice coding functionality is delegated to the Media-Gateway. The MG performs as an inter-working function, which translates PCM over T1 streams to voice over IP streams. The PDSN, as in traditional mobile networks, provide the IP connectivity to the WAN (i.e., Internet) or enterprise LAN (i.e., Intranet).

As used herein, the terms picoBTS and picoBSC are interchangeable with BTS and BSC accordingly.

The inter operability specifications between the picoCell BSC and the core network entities are defined, such as the MSC, which comprises a Soft-Switch (SS) and a Media-Gateway (MG), and the PDSN.

The applicability of and deviations from the various IOS interfaces in use between the picoCell BSC and the SS, MG, and PDSN are specified herein.

Various aspects and embodiments of the invention are described in further detail below.

DETAILED DESCRIPTION OF THE PREFERRED EMBODIMENTS

High Level System Architecture

Figure 1A:
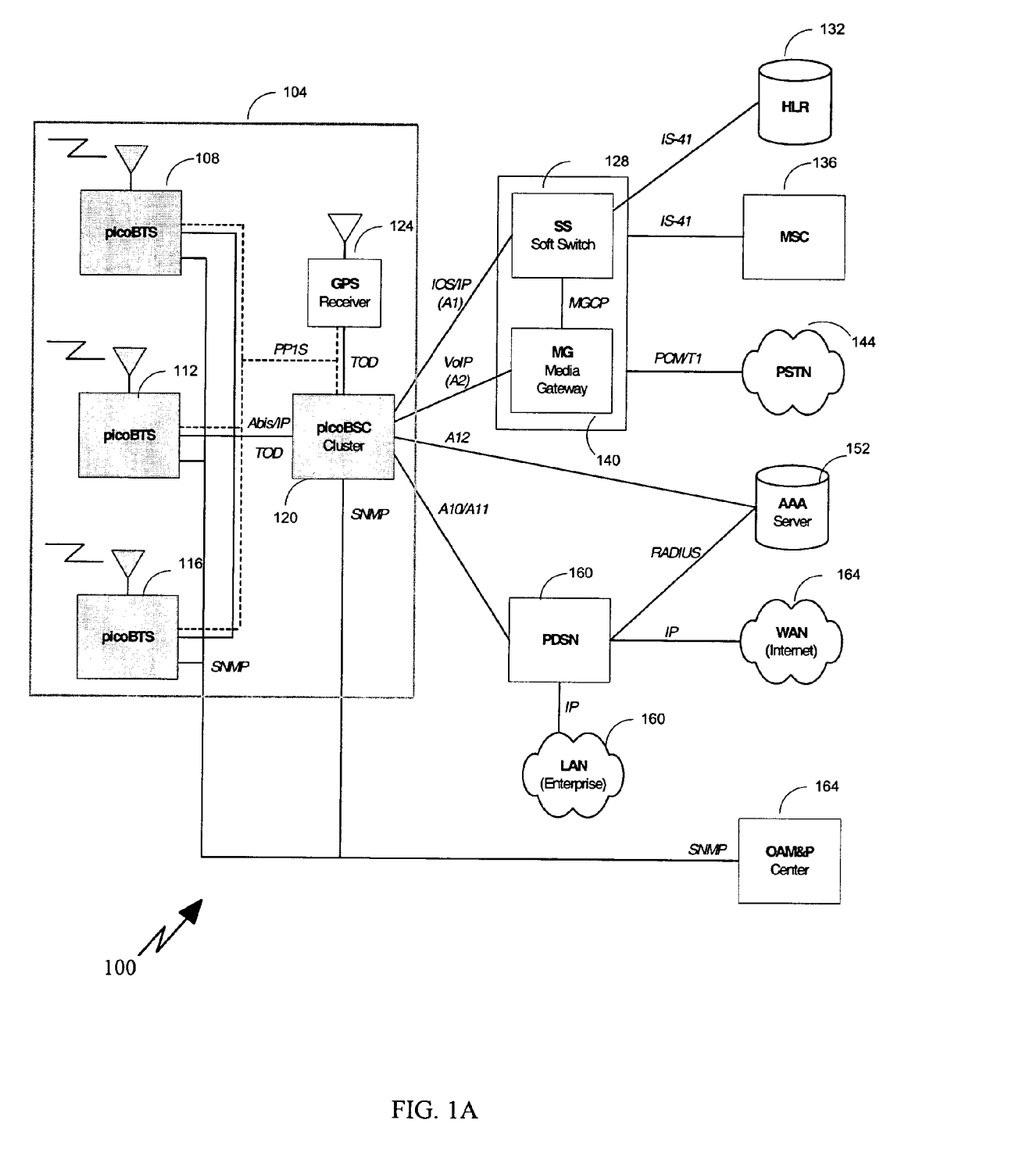
FIG. 1A illustrates a block diagram of a pico-cell system.

FIG. 1A illustrates a block diagram of a high level system 100 of an exemplary picoCell system, with special emphasis on the integration of the picoCell system in the overall mobile network. A picoCell block 104 comprises one or more pico-base station transceivers (BTS) 108, 112, and 116, functionally and/or electrically connected to a pico-base station controller (BSC) 120. The pico-cluster 120 receives accurate timing information from a timing source 124, such as the GPS receiver illustrated in FIG. 1.

The pico-cluster 120 may then communicate with a variety of devices and/or elements. For example, the pico-cluster 120 may communicate to a soft switch 128. Soft switch 128 may subsequently translate data into IS-41 protocol to communicate with a high level register (HLR) 132 or a mobile switching center (MSC) 136. The pico-cluster 120 may also communicate with a media gateway 140, which may then in turn communicate with the public switch telephony network (PSTN) 144. The pico-cluster 120 may also communicate with a packet serving data node (PDSN) 148, which may then be in communication with a server 152, a wireless access network (WAN) 156 (internet), or an enterprise local area network (LAN) 160. The pico-cluster 120 may also communicate with an operation administration management and provisioning (OAM&P) center 164.

Figure 1B:
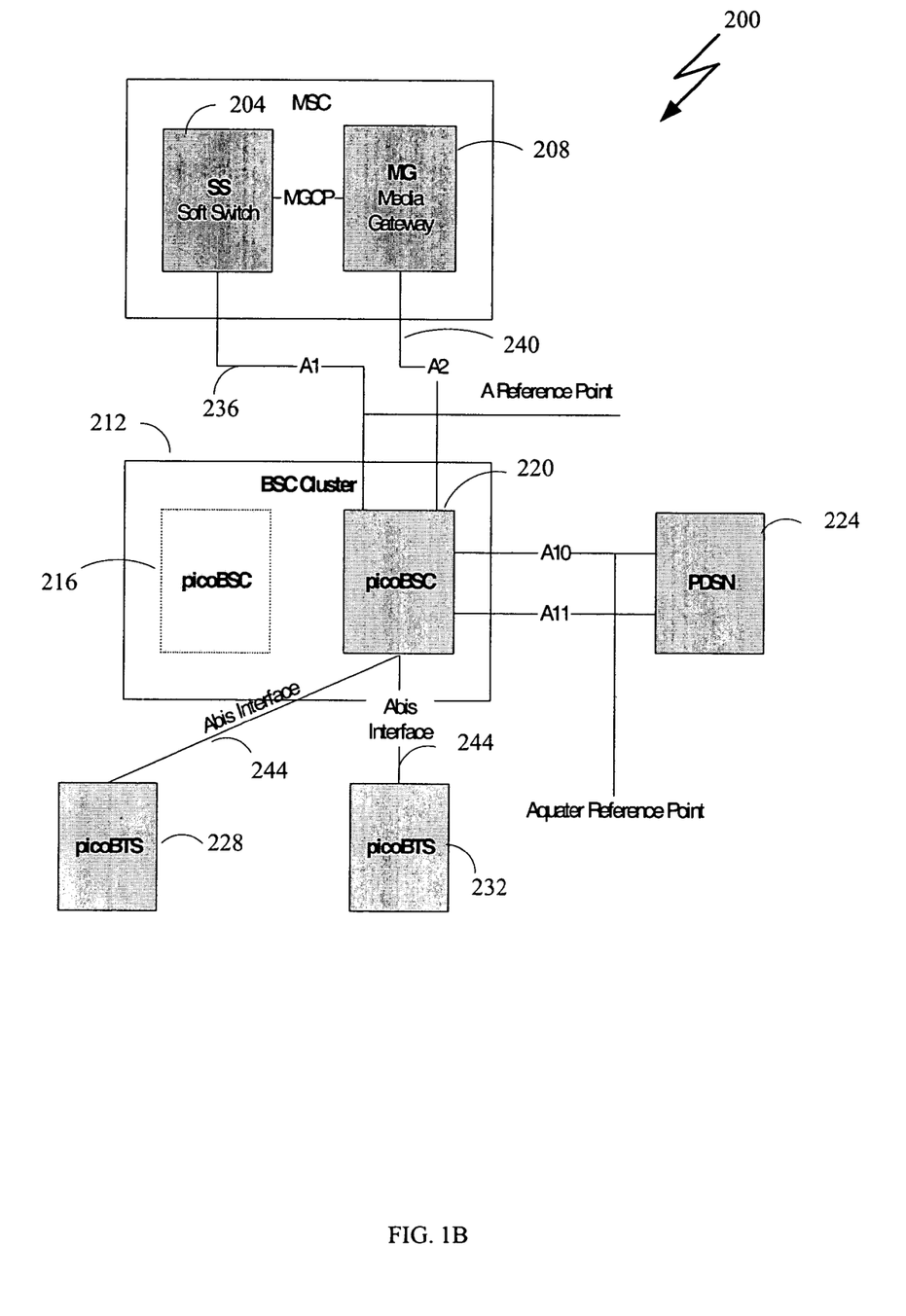
FIG. 1B illustrates a block diagram of various interfaces in a pico-cell system.

FIG. 1B illustrates the network interfaces 200 in a picoCell system FIG. 1B illustrates an exemplary embodiment for a CDMA2000 1x system, however, it may be applicable to HDR, GSM, GSM1x, TDMA, TD-SCDMA, and WCDMA systems as well.

FIG. 1B shows a soft switch 204, a media gateway 208, a BSC cluster 212 comprising pico-BSC 216 and 220, the PDSN 224, and pico-BTS's 228 and 232. An A1 interface 236 connects the soft switch 204 with the picoBSC 216, carrying signaling information between the call control and mobility management functions of the MSC and the call control component of the BSC. An A2 interface 240 interconnects the media gateway 208 with the pico-BSC 216, carrying voice traffic between the MSC and the BSC. An Abis interface 244 interconnects the pico-BSC 216 with each pico-BTS 228 and 232. The Abis interface 244 carries signaling information and traffic between the BSC and BTS. An A10 interface 248 interconnects the pico-BSC 216 with the PDSN 224, and carries data traffic. An A11 252 interface carries signaling information between the BSC 216 and the PDSN 224.

The interfaces of the A reference point 256 are transported over Ethernet, connecting the BSC cluster 212 with the soft-switch (SS) 204 and the media-gateway (MG) 208.

The A1 interface provides a signaling connection between the BSC and the MSC. The standard A1 interface is implemented using the Message Transport Part (MTP) and the Signaling Connection Control Part (SCCP) of the SS#7 signaling stack.

Figure 2:
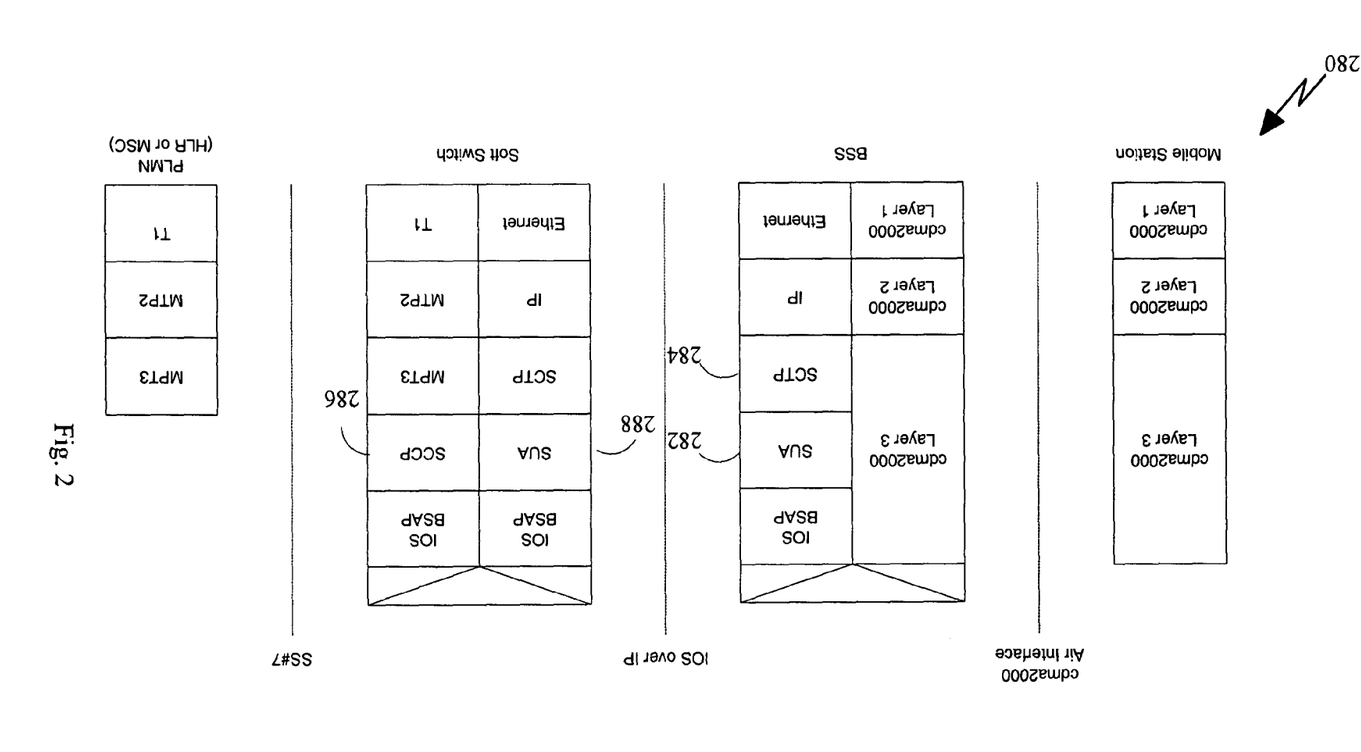
FIG. 2 illustrates the signaling protocol model using a signaling transport (SIGTRAN)

FIG. 2 illustrates the signaling protocol model using a signaling transport (SIGTRAN) suite 280. This is done in order to preserve the functionality of the SCCP, the picoCell system and to defines a set of protocol stacks for transporting signaling information over packet-based networks. The SIGTRAN suite comprises of a Stream Control Transmission Protocol (SCTP) 282 along with user adaptation layers (SUA) 284. For SCCP 286, the SCCP User Adaptation (SUA) layer 288 is used.

Figure 3:
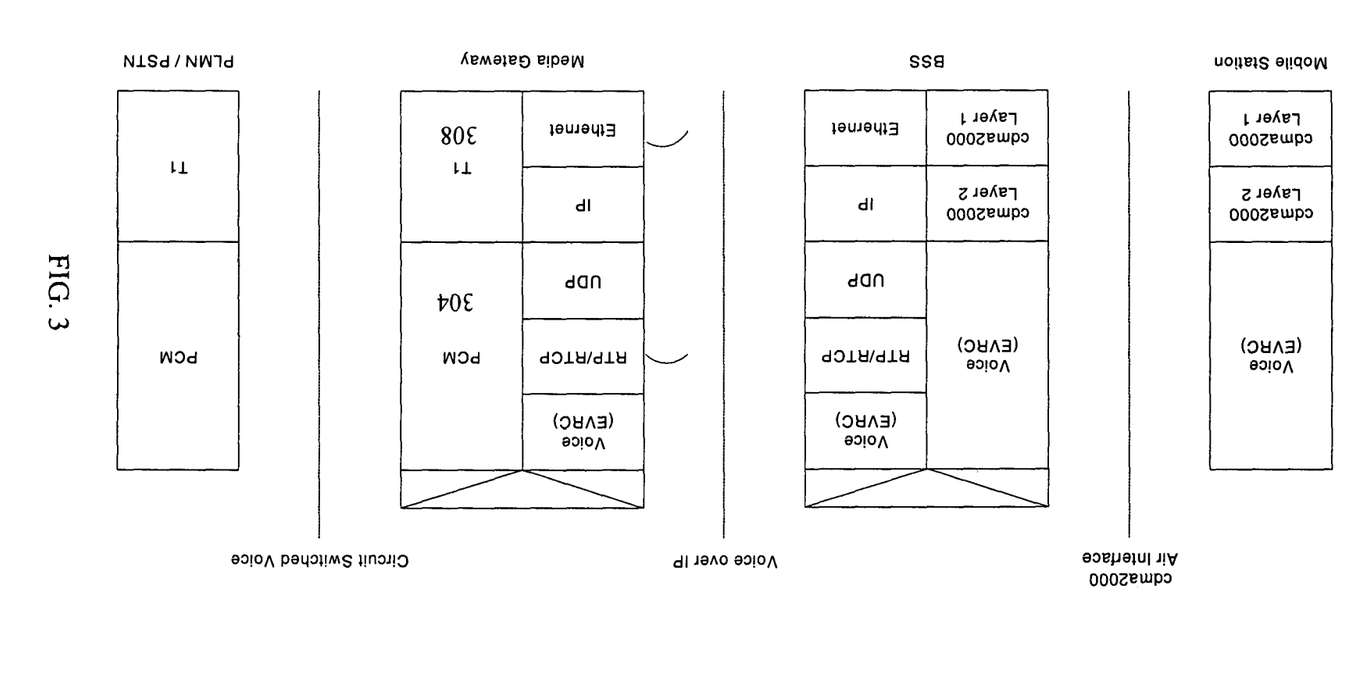
FIG. 3 illustrates the A2 interface.

FIG. 3 illustrates the A2 interface 300. The A2 interface carries coded voice information between the BSC and the MG. The standard A2 interface is based upon PCM 304 over T1 308 (circuit-switched). The picoCell system A2 interface is based upon Ethernet 312, and uses the standard VoIP protocols for transporting the voice packets, including Real-Time Transport Protocol (RTP) and Real-Time Transport Control Protocol (RTCP) 316.

Traditional infrastructure equipment transport voice streams over DS0 circuits between the BSC and the MSC. The MSC is responsible for allocating the circuit on which the voice stream for each call is transported. The MSC selects a Circuit Identity Code (CIC) representing a DS0 circuit on a specific T1 trunk between the BSC and the MSC during the assignment procedure.

The picoCell system transports voice streams between the BSC and the MG via RTP/UDP/IP. In this architecture, the use of CIC in the assignment procedure becomes insignificant, since a different kind of connection representation is required.

RTP sessions ride on top of UDP packets, which are transmitted from a source IP address and port to a destination IP address and port. Instead of using the CIC information element in the circuit-switched stack, the packet-switched voice stack should use an IP address and port number for the source, and an IP address and port number for the destination. NOTE that the source and destination entities are the BSC and the MG or vise-versa.

Typical voice-over-IP systems are capable of negotiating the source and destination IP addresses and ports by exchanging SIP messages. The SIP signaling messages include the description of each end-point of the voice-over-IP session in the form of SDP fields. The IOS signaling messages does not specify the option to exchange such information between the BSC and the MSC, since the IOS specifications were especially designed for circuit-switched voice.

The use of multiple UDP ports at the BSC to support a large number of voice streams might cause a significant degradation of performance. A single UDP port multiplexing all the active voice streams can reduce the processing overhead, in a similar fashion as the A10 interface is defined in the IOS.

In an embodiment, the CIC information element present in the IOS signaling messages is interpreted as the UDP port number of the MG for the call. A different port number is assigned to each active call at the MG.

Since a single and unique CIC information element is exchanged between the SS and the BSC, the same port number shall be used at both ends of the link. In this case, the MG and the BSC shall use the same UDP port number for each specific call. The MG must consider the availability of the same port number at the BSC. Therefore, the set of available port numbers for voice calls should be carefully managed. By allocating a different port number to each voice stream, a standard voice over RTP protocol model can be implemented between the BSC and the MG.

In another embodiment, the solution is based on the use of a single UDP port at the BSC and a single UDP port at the MG, where all the voice streams between them are multiplexed. The UDP port number at the BSC shall be predetermined (and pre-configured), as well as the UDP port number at the MG.

Multiple voice streams are multiplexed in the same ports by making use of the SSRC field of the RTP header to discriminate the packets between different voice calls. The SSRC field of each voice packet shall be set to the CIC value allocated to the call by the SS. The MG and the BSC distinguish the voice packets associated to different calls by analyzing the SSRC field of each arriving voiced packet.

As defined in the RTP specifications, the Synchronization Source (SSRC) represents the source of a stream of RTP packets, identified by a 32-bit numeric SSRC identifier carried in the RTP header so as not to be dependent upon the network address. In general, the SSRC identifier is a randomly chosen value meant to be globally unique within a particular RTP session. In this case, the SS shall generate the SSRC by using only the 16 lower significant bits, since the length of the CIC information element is 16 bits.

This solution also requires the enhancement of the interface between the SS and the MG to inform the MG about the SSRC (or CIC) allocated to each specific call by the SS.

Another solution is to have CSRD representing CIC. In this solution, the SSRC is used by the BSC and the MG as defined in the RTP specifications, and the CIC number is inserted in the RTP header in place of the CSRC field, which in not used by the picoCell network architecture.

As defined in the RTP specifications, the Contributing Source (CSRC) represents a source of a stream of RTP packet that has contributed to the combined stream produced by an RTP mixer. The mixer inserts a list of the SSRC identifiers of the sources that contributed to the generation of a particular packet into the RTP header of that packet. This list is called the CSRC list. An example application is audio conferencing where a mixer indicates all the talkers, whose speech was combined to produce the outgoing packet, allowing the receiver to indicate the current talker, even though all the audio packets contain the same SSRC identifier (that of the mixer).

This solution is based on the use of a single UDP port at the BSC and a single UDP port at the MG, where all the voice streams between them are multiplexed. The UDP port number at the BSC shall be predetermined (and pre-configured), as well as the UDP port number at the MG.

Multiple voice streams are multiplexed in the same ports by making use of the CSRC field of the RTP header to discriminate the packets between different voice calls. The CSRC field of each voice packet shall be set to the CIC value allocated to the call by the SS. The MG and the BSC distinguish the voice packets associated to different calls by analyzing the CSRC field of each arriving voiced packet.

RTP Header Extension (RTP) provides an extension mechanism to allow individual implementations to experiment with new payload-format-independent functions that require additional information to be carried in the RTP data packet header. This mechanism is designed so that the header extension may be ignored by other interoperating implementations that have not been extended.

In one non-limiting embodiment, if the X bit in the RTP header is one, a variable-length header extension is appended to the RTP header, following the CSRC list if present. The header extension contains a 16-bit length field that counts the number of 32-bit words in the extension, excluding the four-octet extension header (therefore zero is a valid length). Only a single extension may be appended to the RTP data header.

The RTP header extension may be used similarly to previous solutions to carry the CIC number in every voice packet between the BSC and the MG.

This solution is based on the use of a single UDP port at the BSC and a single UDP port at the MG, where all the voice streams between them are multiplexed. The UDP port number at the BSC shall be predetermined (and pre-configured), as well as the UDP port number at the MG. Multiple voice streams are multiplexed in the same ports by making use of the RTP header extension to discriminate the packets between different voice calls. The header extension of each voice packet shall be set to the CIC value allocated to the call by the SS. The MG and the BSC distinguish the voice packets associated to different calls by analyzing the RTP header extension of each arriving voiced packet.

The following table presents a summary of the proposed solutions to support packet-switched voice services between the picoCell BSC and the MG.

TABLE 1

Packet-switched voice services solutions

| Solution | Advantages |
| --- | --- |
| CIC interpreted as UDP port number in IOS signaling messages. | Standard RTP usage. Does not require special adaptations at the MG. |
| SSRC representing CIC number in the RTP packet header. | Single UDP port at the BSC. |
| CSRC representing CIC number in the RTP packet header. | Single UDP port at the BSC. CSRC is generally reserved in normal RTP sessions (used only in mixer applications). |
| RTP header extension. | Single UDP port at the BSC. Use of RTP header extension supported by RFC. |

For Header Compression in A2 Interface, IP and UDP header compression mechanisms may be applied to the voice packets exchanged between the BSC and the MG over the A2 interface. This feature minimizes the data throughput requirements, and to emphasize the advantages of packet-switched voice at the A reference point.

Figure 4:
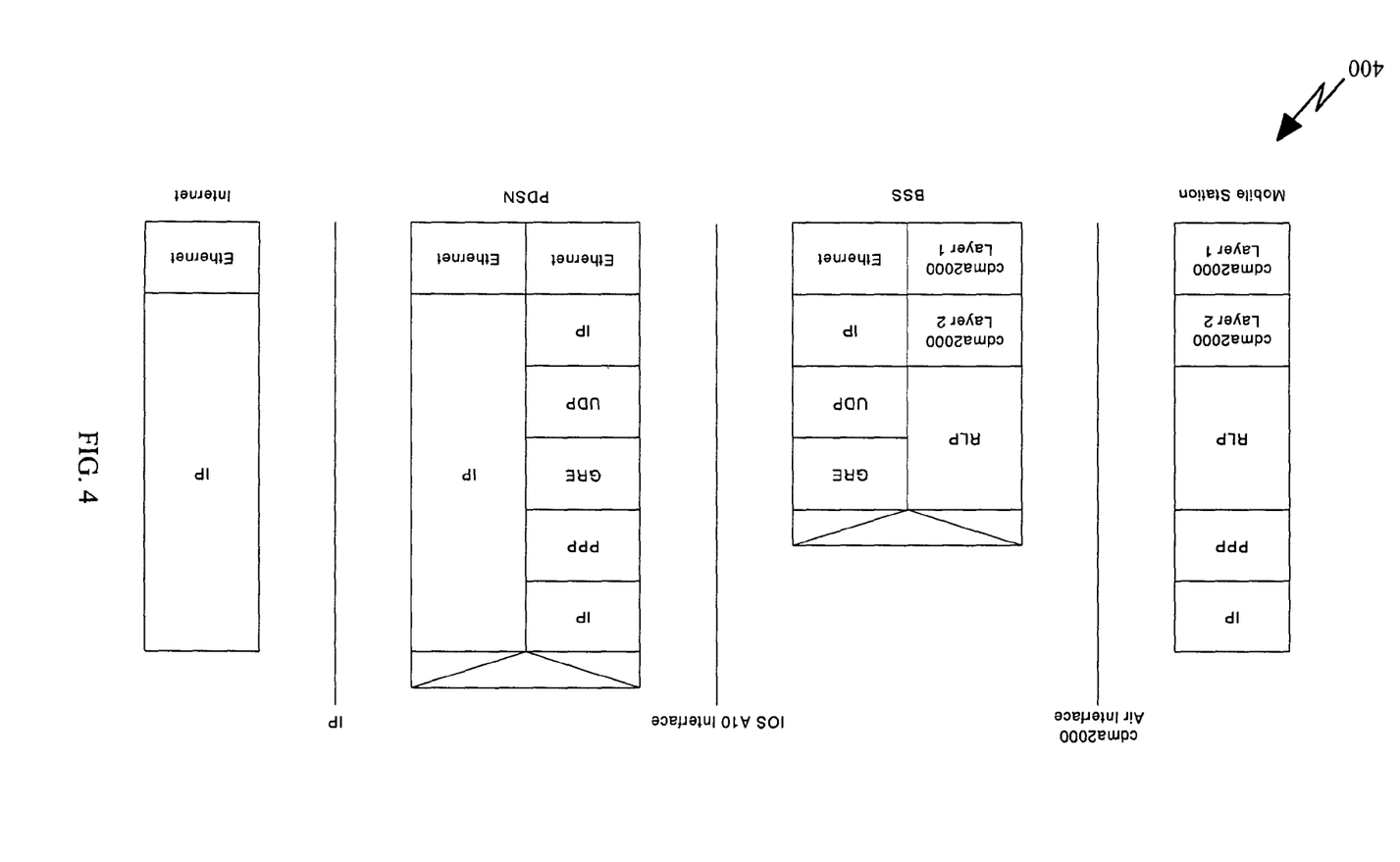
FIG. 4 illustrates a packet data protocol model.

FIG. 4 illustrates a packet data protocol model 400. The A10 interface is used to provide a path for user traffic between the BSC and the PDSN for packet data services. The A10 interface transports link layer/network layer frames between the picoCell system and the PDSN encapsulated in Generic Routing Encapsulation (GRE) packets, which in turn are carried over IP.

The picoCell system supports the standard A10 interface as specified in TIA/EIA-2001.7-B, which is incorporated by reference herein. No modifications to standard A10 interface are required. The A10 interface is implemented over the standard IP stack of the picoCell platform.

Figure 5:
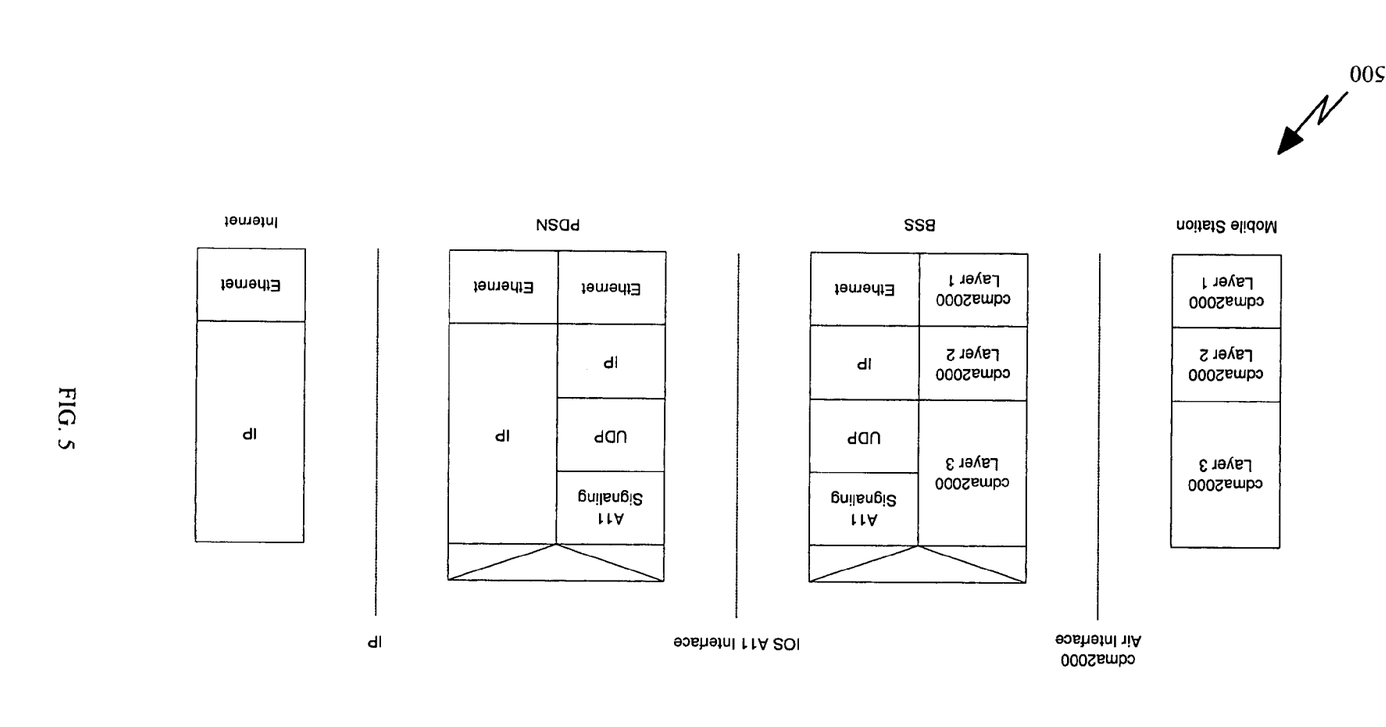
FIG. 5 illustrates an A11 Interface Signaling Protocol Model.

FIG. 5 illustrates an A11 Interface Signaling Protocol Model. The A11 interface carries signaling information between the BSC and the PDSN for packet data services. The A11 interface uses Mobile IP signaling for managing the A10 connections.

The picoCell system supports the standard A10 interface as specified in TIA/EIA-2001.7-B, which is incorporated by reference herein. No modifications to the standard A11 interface are required. The A11 interface is implemented over the standard IP stack of the BSC platform.

Figure 6:
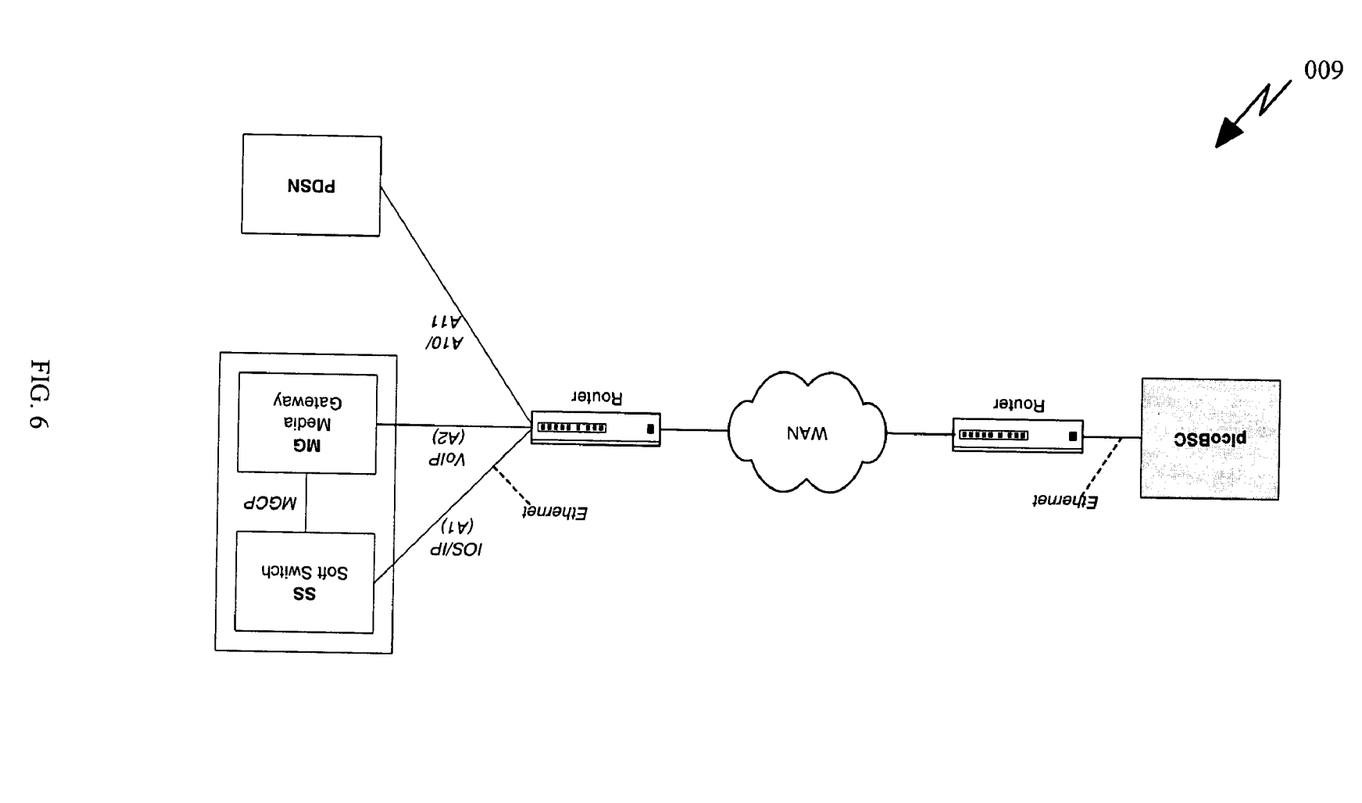
FIG. 6 illustrates remote deployment of the BSC, and its inter-connection with the core network.

FIG. 6 illustrates remote deployment of the BSC, and its inter-connection with the core network via the WAN through a pair of routers 600. The BSC may be deployed in a remote location, rather than on the same local area network (LAN) with the SS, MG, and PDSN. In that case, a direct Ethernet connection between the BSC and the core network is not applicable. In a remote deployment scenario, the BSC and the core network shall be interconnected via a Wide Area Network (WAN). Various different connectivity options may be suitable, such as Fiber ring and DS1 (Unframed-T1).

Each connectivity solution makes use of different Layer 2 protocols, such as ATM, HDLC, or other. Commercial routers or gateways are used between the BSC and the core network to support the various WAN connectivity mechanisms.

As examples, the various illustrative logical blocks, flowcharts, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be ready apparent to those skilled in the art, and the generic principles to find herein may be applied to other embodiments without the use of inventive faculty. Thus, the present invention is not intended to be limited to the embodiments shown herein but is to be accorded the widest scope consistent with the principles and novel features disclosed herein.

The invention claimed is:

1. A method for transporting a first and a second voice-over-internet-protocol (VoIP) stream between a Base Station Controller and a Media Gateway using at least a Real-Time Transport Protocol (RTP) protocol, comprising the steps of: pre-assigning a same User Datagram Protocol (UDP) port number to the Base Station Controller and the Media Gateway; selecting a first Circuit Identity Code for a first VoIP stream; selecting a second Circuit Identity Code for a second VoIP stream; inserting the first Circuit Identity Code into a field of a first RTP header; inserting the second Circuit Identity Code into a field of a second RTP header; multiplexing the first and second VOIP streams together; transmitting the first and second VoIP streams to the pre-assigned UDP port number at the Base Station Controller; wherein inserting the first Circuit Identify Code into the field of the first RTP header is for a first data packet of the first VoIP stream, and wherein inserting the second Circuit Identity Code into the field of the second RTP header is for a second data packet of the second VoIP stream; and wherein the field of the first RTP header and the field of the second RTP header comprise a Synchronization Source field having a 32-bit length, wherein inserting the first Circuit Identity Code into the field of the first RTP header and wherein inserting the second Circuit Identity Code into the field of the second RTP header both further comprise generating the Synchronization Source field using 16 lower significant bits of the 32-bit length field.

2. The method of claim 1, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

3. The method of claim 1, further comprising determining available UDP port numbers, and wherein, the pre-assigning of the same UDP port number further comprises at least one instruction for selecting one of the available UDP port numbers.

4. A computer program product, stored in a memory, for transporting a first and a second voice-over-internet protocol (VoIP) stream between a Base Station Controller and a Media Gateway using at least a Real-Time Transport Protocol (RTP) protocol, comprising:
at least one instruction for pre-assigning a same User Datagram Protocol (UDP) port number to the Base Station Controller and the Media Gateway; at least one instruction for selecting a first Circuit Identity Code for a first VoIP stream; at least one instruction for selecting a second Circuit Identity Code for a second VoIP stream; at least one instruction for inserting the first Circuit Identity Code into a field of a first RTP header; at least one instruction for inserting the second Circuit Identity Code into a field of a second RTP header; at least one instruction for multiplexing the first and second VoIP streams together; at least one instruction for transmitting the first and second VoIP Streams to the pre-assigned UDP port number at the Base Station Controller; wherein the at least one instruction for inserting the first Circuit Identity Code into the field of the first RTP header is for a first data packet of the first VoIP stream, and wherein the at least one instruction for inserting the second Circuit Identity Code into the field of the second RTP header is for a second data packet of the second VoIP stream; and wherein the field of the first RTP header and the field of the second RTP header comprise a Synchronization Source field having a 32-bit length, wherein inserting the first Circuit Identity Code into the field of the first RTP header and wherein inserting the second Circuit Identity Code into the field of the second RTP header both further comprise generating the Synchronization Source field using 16 lower significant bits of the 32-bit length field.

5. The computer program product of claim 4, wherein the first Circuit Identity Code in the field of the first RTP header and the second Circuit Identity Code in the field of the second RTP header respectively identify the first VoIP stream with a first voice call and the second VoIP stream with a second voice call, different from the first Voice call.

6. The computer program product of claim 4, further comprising at least one instruction for determining available UDP port numbers, and wherein the at least one instruction for pre-assigning of the same UDP port number further comprises at least one instruction for selecting one of the available UDP port numbers.

7. An apparatus for transporting a first and a second voice-over-internet protocol (VoIP) stream between a Base Station Controller and a Media Gateway using at least a Real-lime Transport Protocol (RTP) protocol, comprising: means for pre-assigning a same User Datagram Protocol (UDP) port number to the Base Station Controller and the Media Gateway; means for selecting a first Circuit Identity Code for a first VoIP stream; means for selecting a second Circuit Identity Code for a second VoIP stream; means for inserting the first Circuit Identity Code into a field of a first RTP header; means for inserting the second Circuit Identity Code into a field of a second RTP header; means for multiplexing the first and second VOIP streams together; means for transmitting the first and second VoIP streams to the pre-assigned UDP port number at the Base Station Controller; wherein inserting the first Circuit Identify Code into the field of the first RTP header is for a first data packet of the first VoIP stream, and wherein inserting the second Circuit Identity Code into the field of the second RTP header is for a second data packet of the second VoIP stream; and wherein the field of the first RTP header and the field of the second RTP header comprise a Synchronization Source field having a 32-bit length, wherein inserting the first Circuit Identity Code into the field of the first RTP header and wherein inserting the second Circuit Identity Code into the field of the second RTP header both further comprise generating the Synchronization Source field using 16 lower significant bits of the 32-bit length field.

8. The apparatus of claim 7, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

9. The apparatus of claim 7, further comprising means for determining available UDP port numbers, and wherein the means for pre-assigning of the same UDP port number further comprises means for selecting one of the available UDP port numbers.

10. A method for transporting a first and a second voice-over-internet-protocol (VoIP) stream between a Base Station Controller and a Media Gateway using at least a Real-Time Transport Protocol (RTP) protocol, comprising the steps of:
receiving RTP data packets at a pre-defined User Datagram Protocol (UDP) port number, the RTP data packets comprising a first VoIP stream, and a second VoIP stream;
identifying the first VoIP stream if a field of an RTP header comprises a first Circuitry Identity Code;
identifying the second VoIP stream if the field comprises a second Circuitry Identity Code;
constructing the first VoIP stream from data within an RTP data packet having the first Circuitry Identity Code;
constructing the second VoIP stream from data within an RTP data packet having the second Circuitry identity Code;
transmitting the first and second VoIP streams to a same pre-defined UDP port number at the Base Station Controller; and
wherein the field comprises a Synchronization Source field having a 32-bit length with the first Circuit Identity Code or the second Circuit Identity Code using 16 lower significant bits of the 32-bit length field.

11. The method of claim 10, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

12. The method of claim 10, further comprising determining available UDP port numbers, and providing the pre-defined UDP port number from one of the available UDP port numbers.

13. A computer program product, stored in a memory, for transporting a first and a second voice-over-internet protocol (VoIP) stream between a Base Station Controller and a Media Gateway using at least a Real-Time Transport Protocol (RTP) protocol, comprising:
at least one instruction for receiving RTP data packets at a pre-defined User Datagram Protocol (UDP) port number, the RTP data packets comprising a first VoIP stream, and a second VoIP stream; at least one instruction for identifying the first VoIP stream if a field of an RTP header comprises a first Circuitry Identity Code; at least one instruction for identifying the second VoIP stream if the field comprises a second Circuitry Identity Code; at least one instruction for constructing the first VoIP stream from data within an RTP data packet having the first Circuitry Identity Code; at least on instruction for constructing the second VoIP stream from data within an RTP data packet having the second Circuitry Identity Code; at least one instruction for transmitting the first and second VoIP streams to a same pre-defined UDP port number at the Base Station Controller; and wherein the field comprises a Synchronization Source field having a 32-bit length with the first Circuit Identity Code or the second Circuit Identity Code using 16 lower significant bits of the 32-bit length field.

14. The computer program product of claim 13, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

15. The computer program product of claim 13, further comprising at least one instruction for determining available UDP port numbers, and at least one instruction for providing the pre-defined UDP port number from one of the available UDP port numbers.

16. An apparatus for transporting a first and a second voice-over-internet-protocol (VoIP) stream between a Base Station Controller and a Media Gateway using at least a Real-Time Transport Protocol (RTP) protocol, comprising:
means for receiving RTP data packets at a pre-defined User Datagram Protocol (UDP) port number, the RTP data packets comprising a first VoIP stream and a second VoIP stream;
means for identifying the first VoIP stream if a field of an RTP header comprises a first Circuitry Identity Code and for identifying the second VoIP stream if the field comprises a second Circuitry Identity Code;
means for constructing the first VoIP stream from data within an RTP data packet having the first Circuitry Identity Code and for constructing the second VoIP stream from data within an RTP data packet having the second Circuitry Identity Code;
means for transmitting the first and second VoIP streams to a same pre-defined UDP port number at the Base Station Controller; and
wherein the field comprises a Synchronization Source field having a 32-bit length with the first Circuit Identity Code or the second Circuit Identity Code using 16 lower significant bits of the 32-bit length field.

17. The apparatus of claim 16, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

18. The apparatus of claim 16, further comprising means for determining available UDP port numbers, and means for providing the pre-defined UDP port number from one of the available UDP port numbers.

19. At least one processor configured to transport a first and a second voice-over-internet protocol (VoIP) stream between a Base Station Controller and a Media Gateway using at least a Real-Time Transport Protocol (RTP) protocol, executing the instructions of:
   pre-assigning a same User Datagram Protocol (UDP) port number to the Base Station Controller and the Media Gateway;
   selecting a first Circuit Identity Code for a first VoIP stream;
   selecting a second Circuit Identity Code for a second VoIP stream;
   inserting the first Circuit Identity Code into a field of a first RTP header;
   inserting the second Circuit Identity Code into a field of a second RTP header;
   multiplexing the first and second VOIP streams together;
   transmitting the first and second VoIP streams to the pre-assigned UDP port number at the Base Station Controller;
   wherein inserting the first Circuit Identify Code into the field of the first RTP header is for a first data packet of the first VoIP stream, and wherein inserting the second Circuit Identity Code into the field of the second RTP header is for a second data packet of the second VoIP stream; and
   wherein the field of the first RTP header and the field of the second RTP header comprise a Synchronization Source field having a 32-bit length, wherein inserting the first Circuit Identity Code into the field of the first RTP header and wherein inserting the second Circuit Identity Code into the field of the second RTP header both further comprise generating the Synchronization Source field using 16 lower significant bits of the 32-bit length field.

20. The at least one processor of claim 19, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

21. The at least one processor of claim 19, further comprising an eighth processing component for, determining available UDP port numbers, and wherein the first processing component for pre-assigning of the same UDP port number further comprises a ninth processing component for selecting one of the available UDP port numbers.

22. At least one processor configured to transport a first and a second voice-over-internet protocol (VoIP) stream between a Base Station Controller and a Media Gateway using at least a Real-Time Transport Protocol (RTP) protocol, executing the instructions of:
   receiving RTP data packets at a pre-defined User Datagram Protocol (UDP) port number, the RTP data packets comprising a first VoIP stream, and a second VoIP stream;
   identifying the first VoIP stream if a field of an RTP header comprises a first Circuitry Identity Code;
   identifying the second VoIP stream if the field comprises a second Circuitry Identity Code;
   constructing the first VoIP stream from data within an RTP data packet having the first Circuitry Identity Code;
   constructing the second VoIP stream from data within an RTP data packet having the second Circuitry Identity Code;
   transmitting the first and second VoIP streams to a same pre-defined UDP port number at the Base Station Controller; and wherein the field comprises a Synchronization Source field having a 32-bit length with the first Circuit Identity Code or the second Circuit Identity Code using 16 lower significant bits of the 32-bit length field.

23. The at least one processor of claim 22, wherein the first Circuit Identity Code in the field of the first RTP header and the second Circuit Identity Code in the field of the second RTP header respectively identify the first VoIP stream with a first voice call and the second VoIP stream with a second voice call different from the first voice call.

24. The at least one processor of claim 22, further comprising an eighth processing component for determining available UDP port numbers, and a ninth processing component for providing the pre-defined UDP port number from one of the available UDP port numbers.

* * * * *

UNITED STATES PATENT AND TRADEMARK OFFICE
CERTIFICATE OF CORRECTION

PATENT NO. : 7,733,821 B2  Page 1 of 1
APPLICATION NO. : 10/641454
DATED : June 8, 2010
INVENTOR(S) : Kolor et al.

It is certified that error appears in the above-identified patent and that said Letters Patent is hereby corrected as shown below:

Column 8, line 57, claim 5: "call, different" to read as --call different--

Column 8, line 57, claim 5: "Voice" to read as --voice--

Column 8, line 66, claim 7: "Real-lime" to read as --Real-Time--

Column 11, line 39, claim 20: "claim 19 ," to read as --claim 19,--

Signed and Sealed this
Twelfth Day of July, 2011

David J. Kappos
*Director of the United States Patent and Trademark Office*